United States Patent
Liu et al.

(10) Patent No.: US 10,693,176 B2
(45) Date of Patent: Jun. 23, 2020

(54) HYBRID CELL DESIGN OF ALTERNATIVELY STACKED OR WOUND LITHIUM ION BATTERY AND CAPACITOR ELECTRODES

(71) Applicant: GM GLOBAL TECHNOLOGY OPERATIONS LLC, Detroit, MI (US)

(72) Inventors: Haijing Liu, Shanghai (CN); Zhiqiang Yu, Shanghai (CN); Jianyong Liu, Shanghai (CN); Xiaochao Que, Shanghai (CN); Mark W. Verbrugge, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 558 days.

(21) Appl. No.: 15/221,963

(22) Filed: Jul. 28, 2016

(65) Prior Publication Data
US 2018/0034094 A1   Feb. 1, 2018

(51) Int. Cl.
*H01M 10/04* (2006.01)
*H01M 10/0525* (2010.01)
(Continued)

(52) U.S. Cl.
CPC ........ *H01M 10/0431* (2013.01); *H01G 11/06* (2013.01); *H01G 11/10* (2013.01); *H01G 11/26* (2013.01); *H01G 11/28* (2013.01); *H01G 11/30* (2013.01); *H01G 11/50* (2013.01); *H01M 4/131* (2013.01); *H01M 4/136* (2013.01); *H01M 4/1315* (2013.01); *H01M 4/483* (2013.01); *H01M 4/485* (2013.01); *H01M 4/58* (2013.01);
(Continued)

(58) Field of Classification Search
CPC ........ H01M 10/0431; H01M 10/0436; H01M 4/483; H01M 4/1315; H01M 10/0525; H01M 4/58; H01M 4/661; H01M 4/485; H01M 4/131; H01M 4/136; H01G 11/50; H01G 11/30; H01G 11/10; H01G 11/06; H01G 11/26; H01G 11/28; H01G 11/52
See application file for complete search history.

(56) References Cited

U.S. PATENT DOCUMENTS

2010/0092866 A1* 4/2010 Kim .................... H01M 4/0419
                                                                429/231.2
2010/0203362 A1* 8/2010 Lam ...................... H01M 4/56
                                                                429/7

FOREIGN PATENT DOCUMENTS

| CN | 101847764 A | 9/2010 |
| CN | 102201604 A | 9/2011 |

* cited by examiner

*Primary Examiner* — Lisa S Park
(74) *Attorney, Agent, or Firm* — Reising Ethington P.C.

(57) ABSTRACT

Electrodes are formed with a porous layer of particulate electrode material bonded to each of the two major sides of a compatible metal current collector. In one embodiment, opposing electrodes are formed with like lithium-ion battery anode materials or like cathode materials or capacitor materials on both sides of the current collector. In another embodiment, a battery electrode material is applied to one side of a current collector and capacitor material is applied to the other side. In general, the electrodes are formed by combining a suitable grouping of capacitor layers with un-equal numbers of anode and cathode battery layers. One or more pairs of opposing electrodes are assembled to provide a combination of battery and capacitor energy and power properties in a hybrid electrochemical cell. The cells may be formed by stacking or winding rolls of the opposing electrodes with interposed separators.

9 Claims, 7 Drawing Sheets

(51) Int. Cl.
  *H01M 4/131*    (2010.01)
  *H01M 4/136*    (2010.01)
  *H01M 4/485*    (2010.01)
  *H01M 4/58*     (2010.01)
  *H01M 4/66*     (2006.01)
  *H01G 11/28*    (2013.01)
  *H01G 11/52*    (2013.01)
  *H01M 4/1315*   (2010.01)
  *H01G 11/26*    (2013.01)
  *H01M 4/48*     (2010.01)
  *H01G 11/30*    (2013.01)
  *H01G 11/50*    (2013.01)
  *H01G 11/06*    (2013.01)
  *H01G 11/10*    (2013.01)

(52) U.S. Cl.
  CPC ....... *H01M 4/661* (2013.01); *H01M 10/0436* (2013.01); *H01M 10/0525* (2013.01); *H01G 11/52* (2013.01)

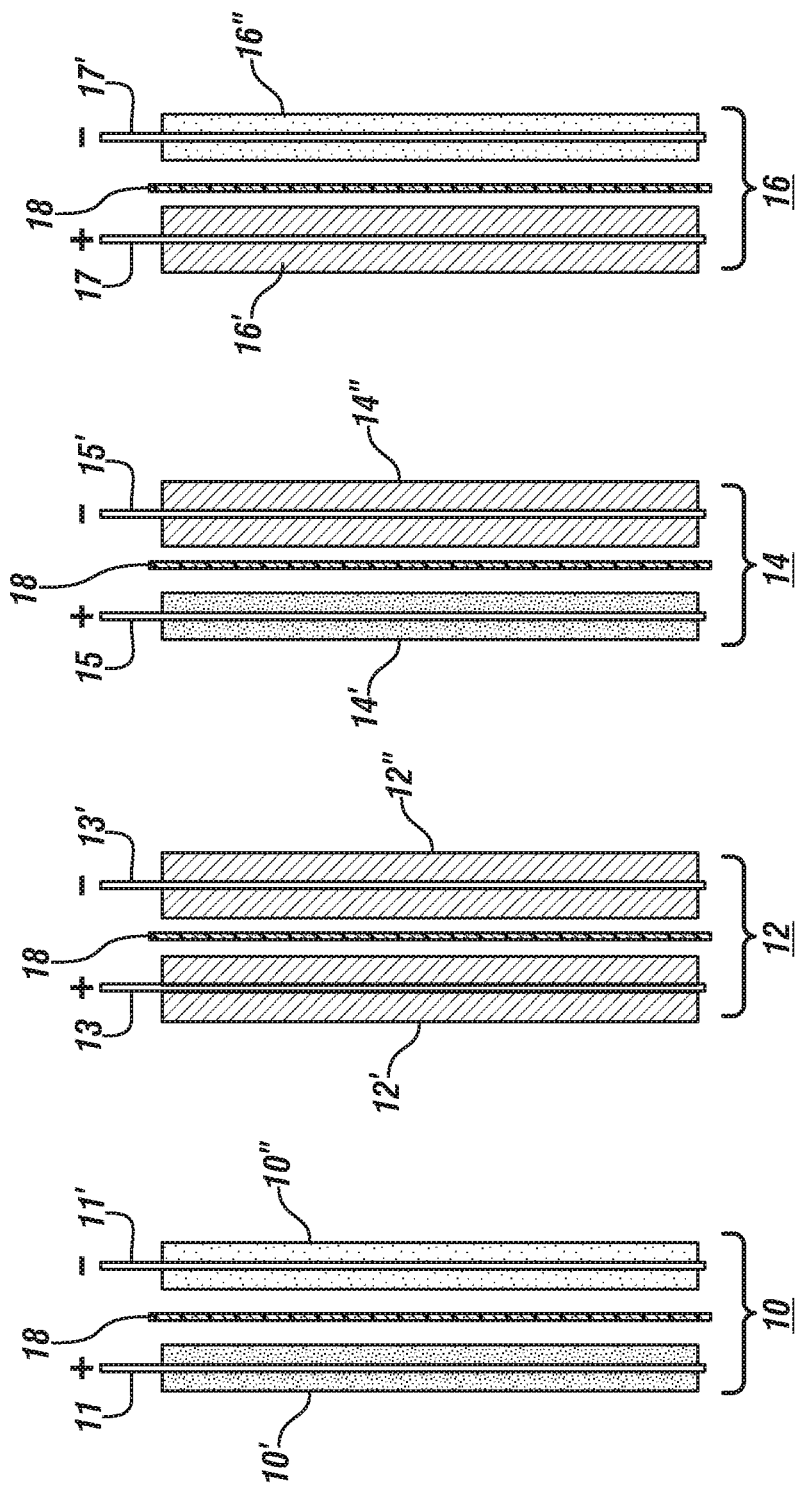

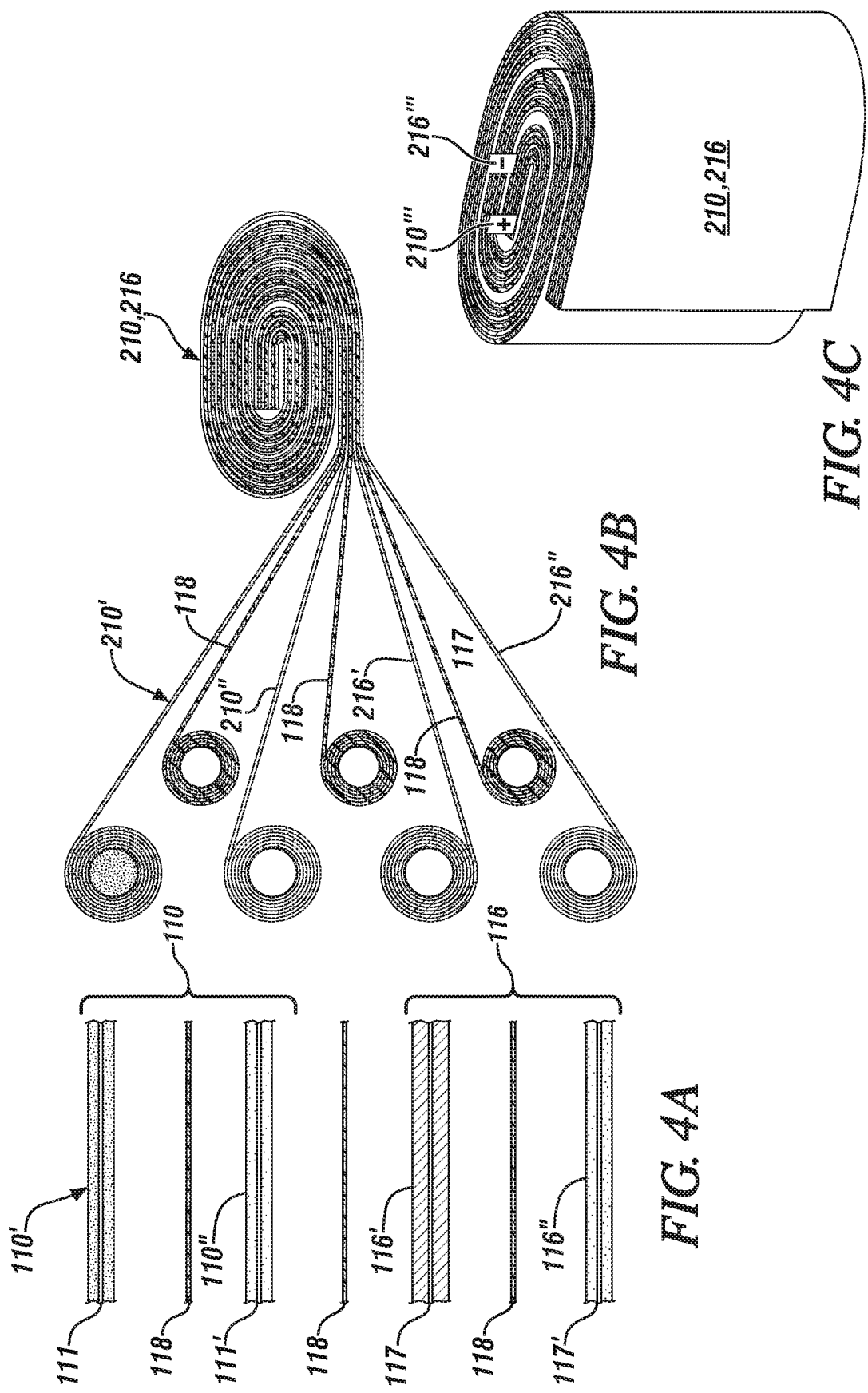

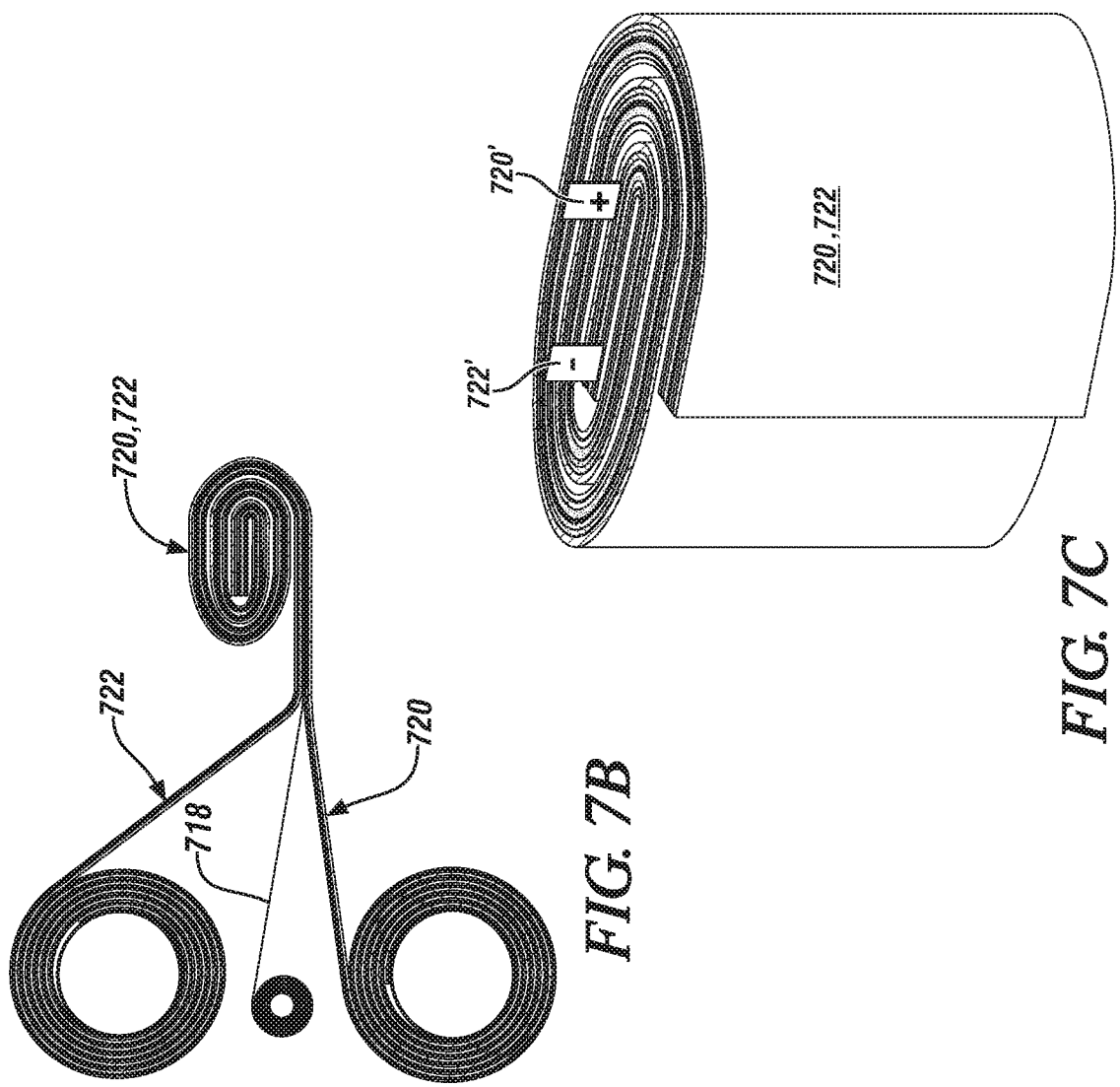
FIG. 7B
FIG. 7C
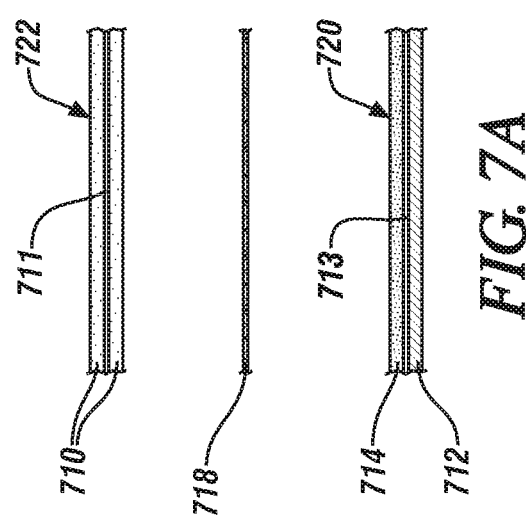
FIG. 7A

HYBRID CELL DESIGN OF ALTERNATIVELY STACKED OR WOUND LITHIUM ION BATTERY AND CAPACITOR ELECTRODES

TECHNICAL FIELD

Lithium-ion battery anodes and cathodes, formed of a porous layer of anode or cathode material on each side of a current collector foil, are used in combination with two-side-coated lithium-ion-adsorbing capacitor electrodes to form hybrid electrochemical cells. Combinations of the battery electrodes and capacitor electrodes are prepared and arranged to provide a predetermined combination of battery and capacitor properties in each such individual hybrid cell. In a second embodiment, a porous layer of lithium-ion battery anode material or of lithium-ion battery cathode material is formed on one side of a current collector foil and a porous layer of capacitor material is formed on the other side of the current collector. Such hybrid, two-side-coated battery material/capacitor material electrodes are used in combination with the two-side-coated lithium-ion battery anodes or cathodes or capacitor electrodes to impart a predetermined combination of battery and capacitor properties in new hybrid lithium cells.

BACKGROUND OF THE INVENTION

The material presented as background information in this section of the specification is not necessarily prior art.

Electric-powered automotive vehicles use multi-cell batteries to provide electrical energy for providing electrical power for driving the vehicle and for providing electrical energy to many devices on the vehicle. Batteries comprising many lithium-ion electrochemical cells are examples of such electrical power sources. And such batteries are used in many non-automotive applications.

In some applications it may be useful to combine a lithium-ion battery with a capacitor. For example, such capacitors may be charged during braking of the vehicle and the stored electrical charge used in recharging cells of the lithium-ion battery.

There is a need for a practice to jointly package and employ cells for lithium-ion batteries and such capacitors for efficiency in their mutual interconnection and interaction.

SUMMARY OF THE INVENTION

In accordance with practices of this invention, anode and cathode materials for lithium-ion batteries are used in varying combinations with compatible capacitor materials to form electrodes for hybrid electrochemical cells to conveniently provide different predetermined combinations of lithium-ion battery properties and capacitor properties. Such combinations of lithium battery electrodes and capacitor electrodes can be readily adapted and arranged to produce different, useful combinations of energy densities (Wh/kg) and power densities (W/kg) in a hybrid electrochemical cell that better adapts its use in different applications. Throughout we shall refer to anode for the negative electrode and cathode for the positive electrode.

In general, each electrode is formed of a suitable current collector foil that is coated on both sides with a porous layer of micrometer-size particles of active lithium-ion battery anode particles, or of cathode particles, or with a porous layer of like-wise sized capacitor particles. Each such two-side coated electrode is typically less than a millimeter in thickness. And each electrode is shaped in its other two dimensions so that alternating positive and negatively charged electrodes may be assembled with interposed, thin, porous separator layers in the formation of a hybrid battery/capacitor electrochemical cell. Such a hybrid cell may be formed of a stack of like-shaped (typically rectangular shaped) alternating positive and negative electrodes and separators. In a different cell assembly method, the cell may be formed by winding like-shaped (typically long rectangular strips) alternating two-sided positive and negative electrodes and separators layers into rolled assemblies. In a formed cell, the micro-pores of the alternating electrodes and separators are filled with a lithium cation-conducting electrolyte composed of one or more lithium salts (such as $LiPF_6$) dissolved in a non-aqueous liquid electrolyte that functions at the required operating temperature range of the hybrid cell.

By way of an illustrative example, a suitable anode material is graphite particles; a suitable cathode material is particles of $LiNi_xMn_yCo_{(1-x-y)}O_2$ (NMC) or particles of $LiFePO_4$ (LFP); and a suitable capacitor material is particles of activated carbon. In the operation of a cell the anode particles and cathode particles alternately intercalate and de-intercalate lithium ions (Li+), positively charged capacitor electrode particles alternately adsorb and desorb anions (such as $PF_6^-$), and negatively charged capacitor electrode particles alternately adsorb and desorb cations (such as $Li^+$). In general, the process of intercalation/de-intercalation occurs throughout the whole volume of the selected particulate battery electrode material. A gram of battery electrode material can usually intercalate a greater amount of lithium ions than are adsorbed on the surfaces of a like amount of capacitor particles. But the release of lithium ions from battery electrode particles is typically slower than the release of lithium ions from selected capacitor particles. The battery particles are typically capable of producing a greater energy density (Wh/kg) per gram than capacitor particles, but the capacitor particles release adsorbed lithium ions faster and are typically capable of providing a greater power density (W/kg) than battery particles.

In a first embodiment of this invention, four different cell units serve as basic elements for combining into a hybrid cell design of lithium ion battery electrodes and capacitor electrodes. Each cell unit is formed of two electrodes, each with a porous layer of the same particulate electrode material coated on both sides of a compatible current collector foil. The two electrodes are aligned side-by-side with facing electrode layers separated by a porous separator member. And the respective units are like-shaped or shaped complimentarily so that they can be assembled in a predetermined relationship in a stack, or wound in a roll, to form a hybrid lithium-ion battery and capacitor electrochemical cell.

A first cell unit (Unit A) is formed of a two-side coated cathode and a two-side coated anode for a lithium-ion battery. The anode is negatively charged and the cathode positively charged when the cell is being discharged. A second cell unit (Unit B) is formed of a two-sided capacitor positive electrode and a two sided capacitor negative electrode with an interposed separator. A third cell unit (Unit C) is formed of a two-sided cathode electrode (+) and a two-sided capacitor electrode (−) with an interposed porous separator. And a fourth cell unit (Unit D) is formed of a two-sided anode electrode (−) and a two-sided capacitor electrode (+) with an interposed separator. For purposes of illustration: particles of graphite may be used as a battery anode material; particles of NMC may be used as a battery cathode material; and particles of activated carbon may be used in each capacitor electrode.

Combinations of two or more of these cell unit types are combined to form a hybrid cell design combining at least one battery electrode and one capacitor electrode. For example, a combination of cell Units A and C (with an interposed separator) provides a combination of a lithium ion battery cell (LIB) and a lithium capacitor cell (LIC) using a battery cathode material and a capacitor electrode. In their charged state the two anode electrodes are negatively charged and the cathode electrode and capacitor electrode are positively charged. Depending on the compositions and relative amounts of the respective electrode materials, this hybrid combination of cell Units A and C can provide a useful combination of battery energy density and capacitor power density.

As a second illustrative example, a combination of three cell units A, C, and C in a hybrid electrochemical cell provides a combination of a lithium-ion battery cell with two cells using a battery cathode material and capacitor counter-electrodes. In its charged state, the overall combination of units provides a cell with three positively charged battery cathode electrodes, a negatively charged battery anode electrode and two negatively charged capacitor electrodes. This hybrid cell combination, with two negatively charged capacitor electrodes, can provide a different useful combination of battery energy density and capacitor power density.

In a third illustrative example, a combination of four cell units, C, D, D, and B, in a hybrid electrochemical cell provides a combination of a cathode (+)/capacitor (−) cell, two anode (−)/capacitor (+) cells, and a capacitor (+)/capacitor (−) cell in its charged state. And this cell combination, with one battery cathode, two battery anodes, two negatively charged capacitor electrodes, and three positively charged capacitor electrodes, can provide still a different useful combination of battery energy density and capacitor power density.

The energy density and power density of a specific combination of the above described cell units (A), (B), (C), and (D) will depend on the specific electrode materials selected and the loadings of the materials in the electrodes. In general, an increase in the amount of the two side coated capacitor positive electrode material and two side coated capacitor negative electrode material (cell unit B) will increase the power density of a hybrid cell. An increase in the amount of cell unit A will increase the energy density of a hybrid cell. And combinations of cell units C and D can be used to balance the energy and power performance of a cell.

Such hybrid combinations of cell units may be formed by the stacking of individual (typically rectangular shaped) cell units with interposed separators, or by the rolling of an arranged assembly of like-shaped, elongated, cell units with interposed separators.

In a second embodiment of this invention, individual electrodes may be formed of a layer of battery electrode material on one side of a current collector foil and a layer of capacitor material on the opposing face of the current collector foil. Thus, individual electrodes formed of hybrid capacitor/cathode material or hybrid capacitor/anode material may be used in hybrid cell formation in combinations with two-sided cathode electrodes, two-sided anode electrodes, and two sided capacitor electrodes. In general, it is preferred that the resulting two-side coated electrode materials be combined such that there are an un-equal number of layers of anode material and cathode material in the group of paired electrodes in the cells. Hybrid cells, utilizing two-sided hybrid electrodes, in combinations with regular two-sided electrodes can be stacked or wound (or rolled) to form a distinct combination of cell units in a hybrid electrochemical cell. Specific illustrations of such hybrid combinations are presented below in this specification. Such two sided hybrid electrodes permit further refinements in the combinations of energy densities and power densities that can be obtained from hybrid electrochemical lithium battery and capacitor cells.

Other objects and advantages of the invention will be apparent from specific illustrations of practices of the invention which follow below in this specification.

BRIEF DESCRIPTION OF THE DRAWINGS

FIGS. 1A-1D are schematic side views of four cell units for use in forming hybrid electrochemical cells in accordance with one embodiment of this invention. Each illustrated cell unit is formed of an upstanding current collector foil with a connector tab extending upwardly from the top side of the foil. A porous layer of a particulate electrode material is bonded to each major face of the current collector foil. The positive (+) and negative (−) signs above the current collector tabs indicates the electrical charge of the charged electrode in the cell unit (as it is being discharged). One side of each layer of electrode material is placed against a porous separator layer. FIG. 1A illustrates the first cell unit (10) is formed of positively-charged cathode material for a lithium-ion battery cell and negatively charged anode material. FIG. 1B illustrates the second cell unit (12) which is formed of positively charged capacitor material (+) and negatively charged capacitor material (−). FIG. 1C illustrates the third cell unit (14) which is formed of Li-battery cathode material (+) and capacitor material (−). FIG. 1D illustrates a fourth unit cell formed of positively charged capacitor material (+) and negatively charged anode material (−).

In FIG. 2B, the second hybrid electrochemical cell grouping is formed of individual cell units 14, 14, and 10 as illustrated in FIGS. 1C and 1A. And in FIG. 2C, the third hybrid electrochemical cell grouping is formed of individual cell units 14, 16, 16, and 12 as illustrated in FIGS. 1C, 1D, and 1B.

FIG. 4A illustrates side views of short cut-off portions of sheets of electrode and separator layers for winding rectangular strips of individual cell units of the first cell grouping (10:16) into an assembled roll. In FIG. 4A, full coatings of electrode materials have been illustrated on the short cut-off portions each electrode strip 111, 111', 117, and 117'. But the coating on one of the full electrode strips (such as the top layer coating 110' on strip 111) may be staggered, e.g., beginning at the top of one end of one side and ending at the top of the other side, to avoid waste of overlapping active electrode material in the winding process. FIG. 4B illustrates a side view of the winding process by which long rectangular strips of the hybrid cell structure are wound into a cell characterized by individual cell units 10 and 16. FIG. 4C is an oblique side view of the roll structure.

FIG. 5A illustrates side views of a first example which is formed of a hybrid positive electrode formed with capacitor material on one side of the current collector foil and particulate cathode material on the other side of the current collector. The opposing electrode of this first example is a negative electrode formed with particulate anode material on both sides.

Figure 5A:
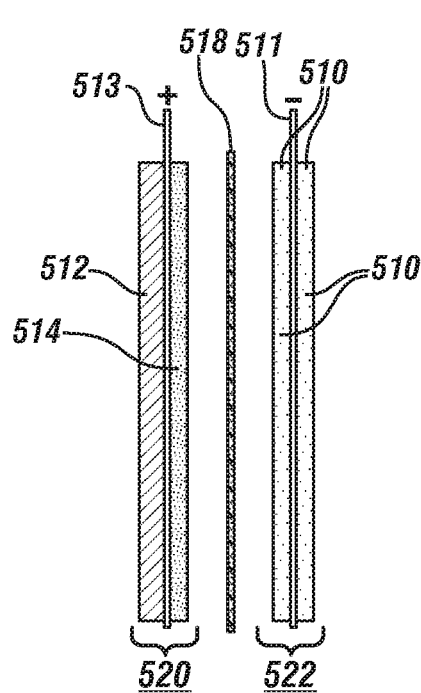
FIGS. 5A-5C are schematic side views of three examples of hybrid electrochemical lithium battery and capacitor cells which are formed by use of one or more hybridized individual electrodes in which one side of the current collector foil is coated with particulate capacitor particles and the other side is coated with particulate anode particles or cathode material for a lithium battery.
Figure 5B:
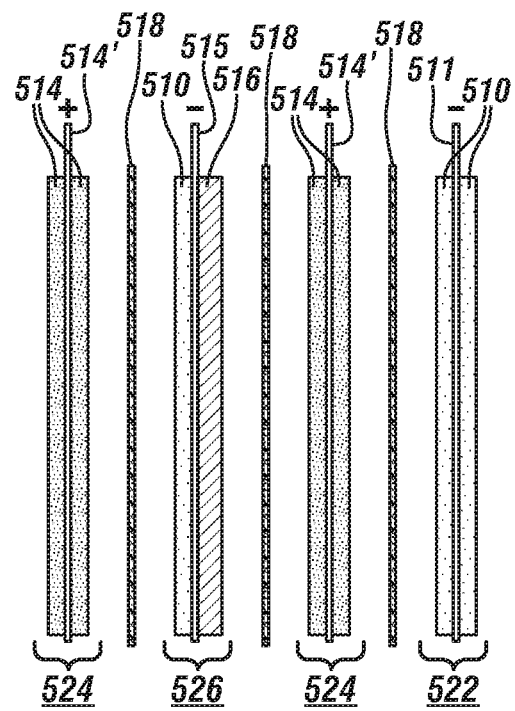

The second example illustrated in FIG. 5B comprises four electrodes (two positive and two negative) with three interposed separators, depicted as their side views. One of the electrodes is a negative hybrid electrode formed of anode material and capacitor material. The other three electrodes include two positive electrodes of cathode material and a negative electrode of anode material.

Figure 5C:
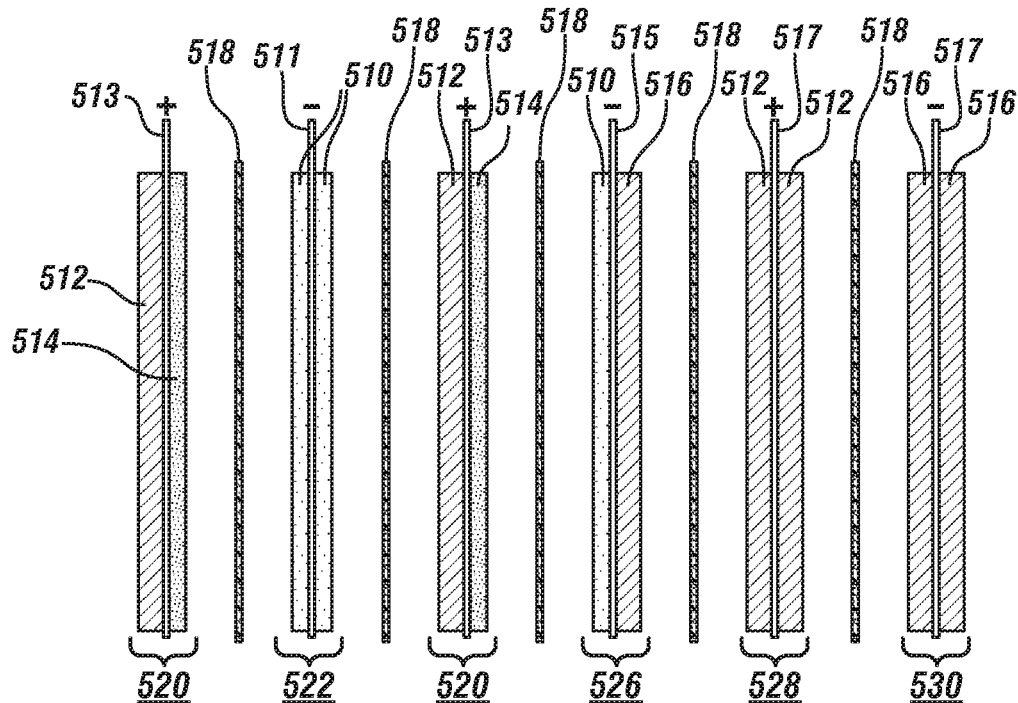

FIG. 5C illustrates in side views, six electrodes (three positive and three negative) with five interposed separators. The three positive electrodes include two electrodes coated on one side of their current collector with capacitor particles and on the other side with particles of cathode material. The third positive electrode is coated on both sides of the current collector with capacitor materials. One negative electrode is formed of anode material. The second negative electrode is formed of an anode material on one side of the current collector and with capacitor particles on the other side of the current collector. The third negative electrode is formed of capacitor particles on both sides of the current collector.

Figure 6A:
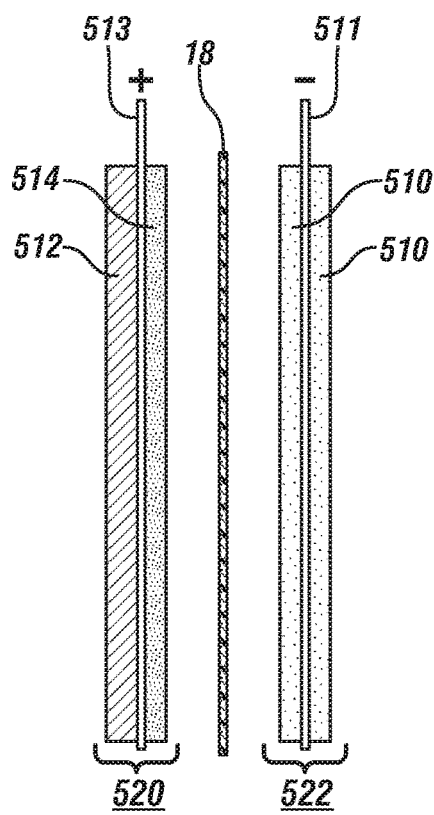
Figure 6B:
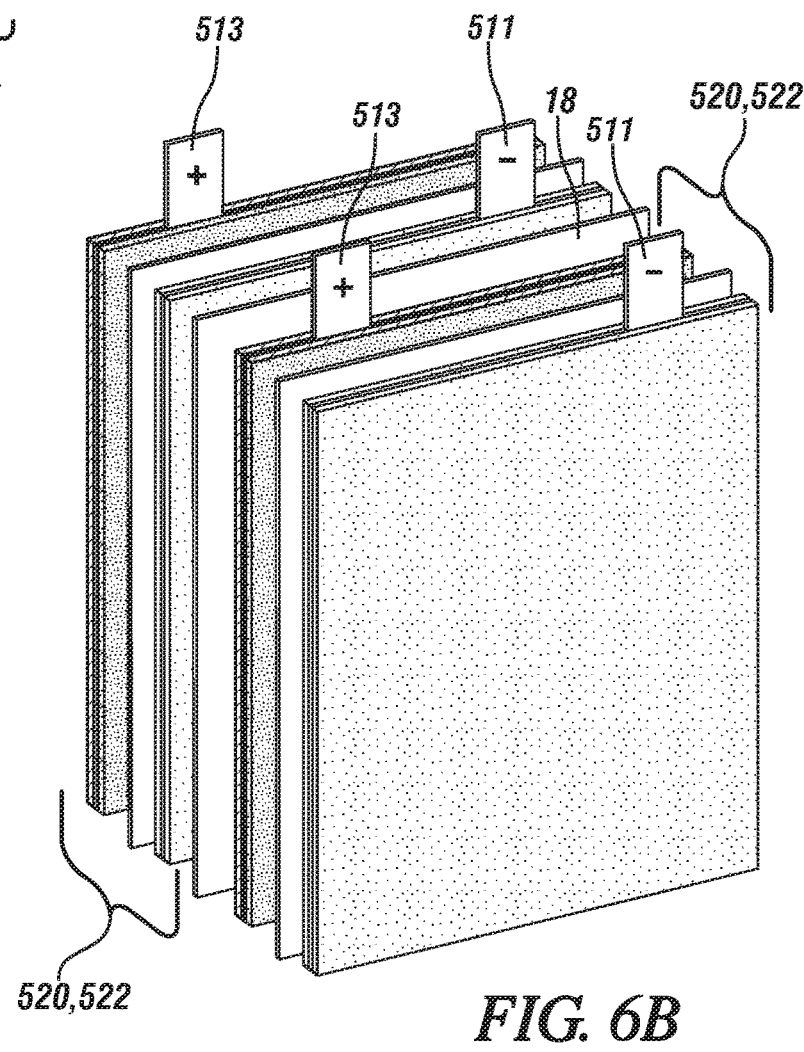

FIG. 6B is an oblique view illustrating the stacking of two units cells, with an interposed separator, of the hybrid electrode materials illustrated in side view FIG. 6A FIG. 7A illustrates side views of short cut-off portions of sheets of electrode and separator layers for rolling of individual cell units of the cell grouping 720, 722 into an assembled roll. Again, in FIG. 7A, like FIG. 4A, full coatings of electrode materials have been illustrated on the short cut-off portions of each electrode strip 720, 722. But the coating on one of the electrodes (such as the top layer coating 714 on strip 720) may be staggered, e.g., beginning at the top of one side and ending at the top of the other side, to avoid waste of overlapping active electrode material in the winding process. FIG. 7B illustrates a side view of the winding process by which long rectangular strips of the hybrid cell structure are wound into a cell characterized by individual electrode layers 720, 722. FIG. 7C is an oblique side view of the roll structure 720, 722 with its upwardly extending terminals 720' (+) and 722' (−).

DESCRIPTION OF PREFERRED EMBODIMENTS

The electrodes of lithium-ion cells are often formed by bonding particles of active electrode materials that have a largest dimension in the range of about 0.5 to 30 micrometers to a compatible metal current collector foil having a thickness of about 5 to 30 micrometers. As stated, the shape of the current collector is often rectangular with side dimensions that provide a surface area to enable it to support a predetermined quantity of electrode material for a lithium-ion battery cell. Each side of the current collector foil may be coated with a porous layer of particles of electrode material, but the sustainable thickness of each layer is usually limited to about 5 nm to 250 nm. The coatings of the respective electrode layers are not necessarily of equal thickness. For example, coating layers of capacitor material may be thicker than coating layers of anode or cathode active materials.

In a first embodiment of this invention, four different electrochemical cell units of opposing positively-charged and negatively-charged porous electrodes of varying compositions of particulate electrode materials are described. Combinations of two or more pairs of these electrodes (cell units) are assembled for use in forming hybrid lithium-ion battery/capacitor cells in accordance with one embodiment of this invention. In a hybrid battery/capacitor electrochemical cell, a predetermined combination of the pairs of opposing electrodes will be assembled with interposed porous separators and the pores of the assembled electrodes and separators infiltrated with a liquid solution of a suitable lithium containing electrolyte.

As stated, in practices of this invention, electrodes are formed of various combinations particles of capacitor materials and lithium-ion battery materials. Activated carbon particles are preferred for use as capacitor materials, whether the electrode in which they are used is positively or negatively charged.

A few examples of suitable electrode materials for an anode electrode (negative electrode during discharge of the cell) of a lithium ion cell are graphite, some other forms of carbon, silicon, alloys of silicon with lithium or tin, silicon oxides ($SiO_x$), metal oxides, and lithium titanate. During cell-discharge, electrons are released from the anode material into the electrical power-requiring external circuit and lithium ions are released (de-intercalated) into an anhydrous lithium ion conducting electrolyte solution. Typically, lithium-ion cell anode materials are resin-bonded as a porous layer onto one or both sides of a copper current collector foil. A small amount of conductivity enhancing carbon particles may be mixed with the anode particles.

Examples of positive electrode materials (cathode), used in particulate form, include lithium manganese oxide, lithium nickel oxide, lithium cobalt oxide, lithium nickel manganese cobalt oxide, other lithium-metal-oxides, and lithium iron phosphate. Other materials are known and commercially available. One or more of these materials may be used in an electrode layer. Typically, lithium-ion cell cathode materials are resin-bonded to one or both sides of an aluminum current collector foil. A small amount of conductivity enhancing carbon particles may be mixed with the cathode particles.

Suitable capacitor cathode and anode materials include, for example: Metal Oxides, MOx, where M=Pb, Ge, Co, Ni, Cu, Fe, Mn, Ru, Rh, Pd, Cr, Mo, W, Nb.

Metal Sulfides, such as $TiS_2$, NiS, $Ag_4Hf_3S_8$, CuS, FeS, $FeS_2$.

Various forms of carbon particles, such as activated carbon, activated carbon fibers, graphite, carbon aerogel, carbide-derived carbon, graphene, graphene oxide, and carbon nanotubes. More than one type of carbon may be used in a blended capacitor material. The same carbon material may be used in both the anode and cathode in an electric double-layer capacitor (EDLC).

Particles of one or more of the following polymers may be used as capacitor material in the cathode of the cell; poly (3-methyl thiophene), polyaniline, polypyrrole, poly(paraphenylene), polyacene, polythiophene, and polyacetylene.

The capacitor particles or lithium-ion battery anode particles or cathode particles are coated or otherwise suitably combined with a suitable amount of a bonding material. For example, the particles may be dispersed or slurried with a solution of a suitable resin, such as polyvinylidene difluoride dissolved in N-methyl-2-pyrrolidone, and spread and applied to a surface of a current collector in a porous layer. Other suitable binder resins include carboxymethyl cellulose/styrene butadiene rubber resins (CMC/SBR) or polytetrafluoroethylene (PTFE). The binders are not electrically conducive and should be used in a minimal suitable amount to obtain a durable coating of porous electrode material without fully covering the surfaces of the particles of electrode material.

In many battery constructions, the separator material is a porous layer of a polyolefin, such as polyethylene (PE), polypropylene (PP), non-woven, cellulose/acryl fibers, cellulose/polyester fibers, or glass fibers. Often the thermoplastic material comprises inter-bonded, randomly oriented fibers of PE or PP. The fiber surfaces of the separator may be coated with particles of alumina, or other insulator material, to enhance the electrical resistance of the separator, while retaining the porosity of the separator layer for infiltration with liquid electrolyte and transport of lithium ions between the cell electrodes. The separator layer is used to prevent direct electrical contact between the facing negative and positive electrode material layers and is shaped and sized to serve this function. In the assembly of the cell, the facing major faces of the electrode material/wire layers are pressed against the major area faces of the separator membrane. A liquid electrolyte is typically injected into the pores of the separator and electrode material layers.

In practices of this invention, metal foil current collectors are coated on both of their major surfaces with porous layers of individual electrode materials. In some embodiments of this invention, an electrode may be coated on both sides with capacitor particles or anode material particles or cathode material particles. In other embodiments of this invention, a metal current collector foil may be coated on one side with capacitor particles and on the other side with one of anode particles or cathode particles. The thus prepared electrode materials may be used in combinations in the assembly of hybrid battery/capacitor cells. Following are illustrations of such combinations of hybrid electrodes in battery/capacitor material electrochemical material cells.

Figure 3B:
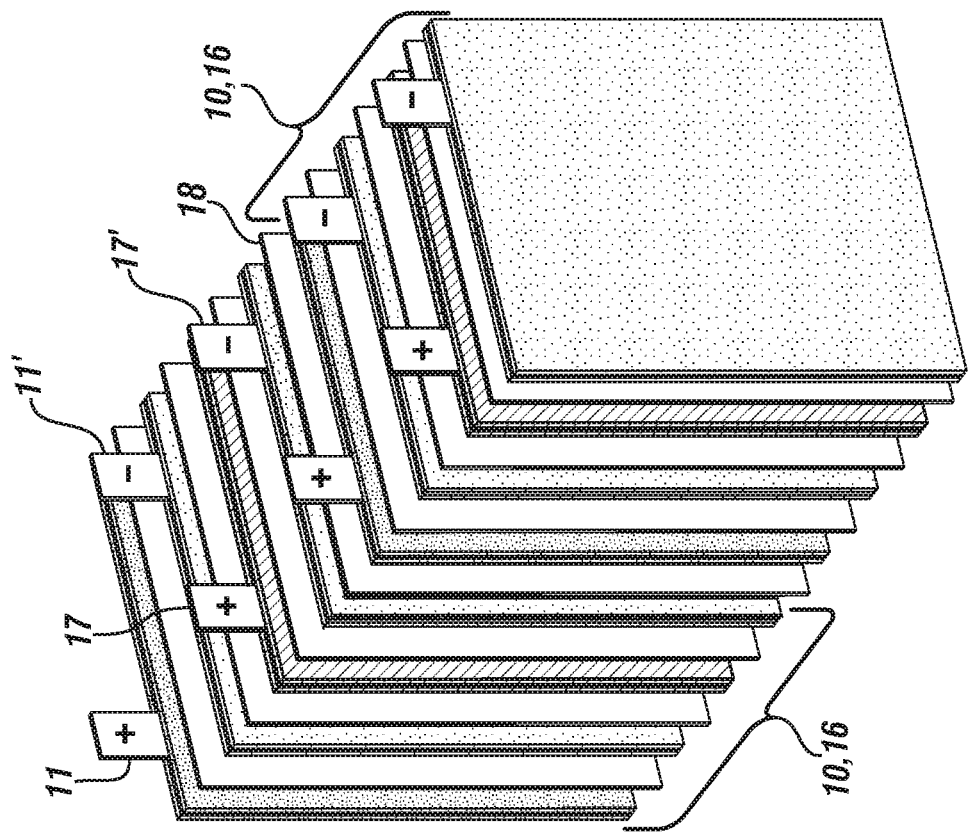
FIG. 3B is a schematic oblique side view showing the stacking of two sets of the first hybrid cell grouping (10:16) which is also illustrated in side view in FIG. 3A.

FIG. 1 illustrates the four cell units in side view for the purpose of showing the two relatively thin porous layers of electrode particles applied to both sides of a metallic current collector foil. The current collector foils are typically rectangular in shape with height and width dimensions suitable for assembly by stacking or winding into a unitary package of one or more electrochemical cells. If the finished electrochemical cell is to be formed of a stacking of two or more cell units (and their interposed separators) the current collector foils with their coatings of electrode materials may be nearly square as illustrated in FIG. 3B. If the finished electrochemical cell is to be formed by winding of the cell units and separators, the foils may be quite long as illustrated in FIGS. 4A-4C.

In FIG. 1A, a first cell unit 10 is formed of a cathode and an anode composed for a lithium-ion battery cell. The cell unit 10 includes a first current collector 11 coated on both sides with thin porous layers of particulate cathode material (e.g., NMC) 10' bonded to the major faces of the current collector 11. Current collector 11 may, for example, be formed of a rectangular aluminum foil with a suitable connector tab (+) on one side, the top side in FIG. 1A. In FIG. 1A a second current collector 11' (e.g., copper foil) is coated on both of its opposing sides with thin porous layers of particulate anode material 10" (e.g., graphite). Current collector 11' also has a suitable connector tab (−) on its top side. In this cell unit the cathode is labeled with a plus (+) charge and the anode is labeled with a minus (−) charge as reflects their state in a charged cell, and as the cell is being discharged. Facing surfaces of an anode layer 10" and a cathode layer 10' are placed against a porous separator 18 of like size and shape. Porous separators 18 are typically formed of polymeric sheets. First cell unit 10 is also described as Unit A in the Summary section presented above in this specification.

In FIG. 1B, a second cell unit 12, structurally similar to the first cell unit 10, is formed of two electrodes, each containing porous layers of particles of capacitor material 12', 12". The electrodes may be formed of like materials but they will experience opposing charges (plus and minus) in the function of the electrodes. A first current collector foil 13 (suitably an aluminum foil) is coated on both of its opposing sides with a porous layer of, for example, activated carbon particles 12' to form a positive (+) capacitor electrode. A second current collector foil 13' (suitably a copper foil) is coated on both of its opposing sides with a porous layer of, for example, activated carbon particles 12" to form an electrode which is designated as (−) in FIG. 1B. The upstanding connector tabs of the respective current collectors (13, 13') are labeled with the respective positive (+) and negative (−) charges of the capacitor materials. Facing surfaces of the respective capacitor layers 12', 12" are placed against a porous separator 18 of like size and shape as the surfaces of the capacitor electrode material. Second cell unit 12 is also described as Unit B in the Summary section presented above in this specification.

In FIG. 1C, a third cell unit 14 is formed of a positive electrode of porous layers of cathode material (e.g., particles of NMC) 14' bonded to both sides of a current collector foil (e.g. an aluminum foil) 15. The third unit cell also includes a negative electrode formed of porous layers of particles of capacitor material 14" bonded to both sides of a copper current collector foil 15'. Again, the respective charges of the cathode material (+) and the capacitor material (−) are indicated on the upstanding connector tabs of their respective current collector foils (15, 15'). Facing surfaces of cathode material 14' and of capacitor material 14" are placed against opposite faces of a porous separator 18. Third cell unit 14 is also described as Unit C in the Summary section presented above in this specification The fourth cell unit 16 (FIG. 1D) is formed of a positive electrode of porous layers of capacitor particles 16' bonded to both sides of a current collector foil 17. The capacitor particles may be particles of activated carbon. The fourth cell unit in this embodiment of the invention also includes a negative electrode of porous layers of anode material 16" (e.g., graphite particles) bonded to both sides of a current collector foil 17'. The respective charges of the capacitor material (+) and the anode material (−) in the charged state of the cell unit are indicated on the upstanding connector tabs of their respective current collector foils (17, 17'). Facing surfaces of capacitor particles 16" and of anode material 16' are placed against opposite faces of a porous separator 18. Fourth cell unit 16 is also described as Unit D in the Summary section presented above in this specification The above described four cell units are used in combinations of at least two of the units and such that at least one capacitor electrode (positive or negative) is used in combination with an un-equal number of battery anodes and cathodes. In each such combination of cell units, they will be assembled as stacks or wound rolls with interposed porous separator layers. And the pores of the electrode layers and separators will be infiltrated with a non-aqueous liquid electrolyte conductive of lithium cations and compatible anions. When desired, each of these new hybrid electrochemical cells may be combinations of two or more of the hybrid cells and the combined cells may be interconnected in parallel or series connection to obtain a hybrid mixture of lithium-ion battery and capacitor electrodes that provide a desired combination of energy and power characteristics.

The electrolyte for a subject hybrid lithium-ion battery/capacitor cell may be a lithium salt dissolved in one or more organic liquid solvents. Examples of suitable salts include lithium hexafluorophosphate ($LiPF_6$), lithium tetrafluoroborate ($LiBF_4$), lithium perchlorate ($LiClO_4$), lithium hexafluoroarsenate ($LiAsF_6$), and lithium trifluoroethanesulfonimide. Some examples of solvents that may be used to dissolve the electrolyte salt include ethylene carbonate, dimethyl carbonate, methylethyl carbonate, propylene carbonate. There are other lithium salts that may be used and other solvents. But a combination of lithium salt and solvent is selected for providing suitable mobility and transport of lithium ions in the operation of the hybrid cell with its battery and capacitor electrode combinations. The electrolyte is carefully dispersed into and between closely spaced layers of the electrode elements and separator layers.

In general, it is preferred to combine cell units to form a hybrid electrochemical cell producing an energy density in the range of 20 Wh/kg to 200 Wh/kg and a power density in the range of 500 W/kg and 10,000 W/kg. Values of energy density and power density depend on the composition of the battery electrode materials and of the capacitor electrode materials, and on the ratio of contents of battery electrode materials and capacitor electrode materials. In general energy density is improved by increasing battery material content and/or by selecting high specific energy battery electrode materials. And the power density of the hybrid electrochemical cell is increased by increasing the content of capacitor electrode material and/or by selecting high specific power density capacitor compositions. The use of combinations of the subject four unit cell units is a convenient and effective method of preparing and using building units to produce one or more hybrid electrochemical cells having a desired combination of energy density and power density properties.

Figure 2A:
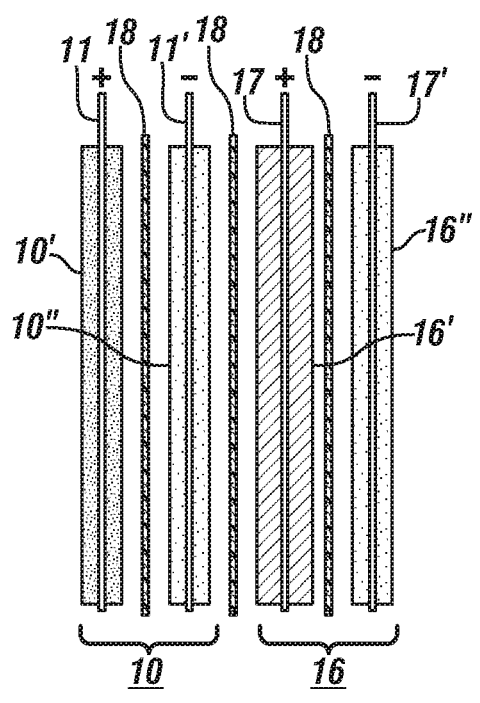
FIGS. 2A through 2C are schematic side views of three groups of stacked hybrid assemblies of two or more of the individual cell units illustrated in FIGS. 1A-1D. Viewed from left to right in FIG. 2A, the first hybrid grouping is formed of individual cell units 10 and 16 (as illustrated in FIGS. 1A and 1D).

In FIG. 2A, a first hybrid electrochemical cell is illustrated. In this example, the hybrid electrochemical cell is formed by a combination of cell unit 10 (as described with respect to FIG. 1A) with cell unit 16 (as described with respect to FIG. 1D). This hybrid electrochemical cell (10, 16) comprises a positive electrode of cathode material 10' and a positive capacitor electrode 16' and two negative electrodes 10", 16" of anode material for a lithium-ion cell. An additional porous separator 18 is placed between the unit cell units 10, 16. The connector tabs of the positively charged capacitor material and the cathode material are to be interconnected in parallel combination. And the two connector tabs of negatively charged anode material are to be interconnected in parallel connection. The shapes of the respective layered electrodes will enable them to be assembled in stacks or wound rolls in forming the hybrid electrochemical cell (10, 16). In this example, the combination of the positively-charged capacitor electrode 16' with the positively charged cathode material 10', and the opposing two negatively-charged anode electrodes 10", 16", alters the power characteristics of the cell in favor of the negative electrodes. Thus, the compositions, thickness, and cross-sectional areas of the electrodes can be varied to provide predetermined energy and power density characteristics of this hybrid electrochemical cell (10, 16).

Figure 2B:
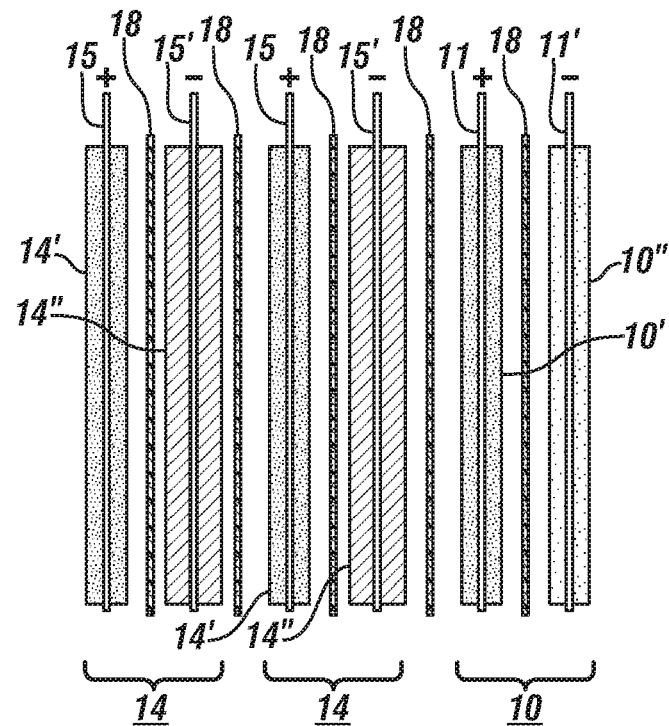

In FIG. 2B, a different hybrid electrochemical cell is illustrated. In this example, the hybrid electrochemical cell is formed by a combination of cell unit 10 with two cell units 14. The resulting assembly of cell units (14, 14, 10) produces a hybrid electrochemical cell comprising three connected positively charged cathode members 10', 14', 14' in combination with one negatively charged anode 10" and two negatively charged capacitor electrodes 14".

It is noted that the capacitor material is used in a positive electrode in the example of FIG. 2A and in a negative electrode in the example of FIG. 2B. Assuming that each of the anode material, cathode material, and capacitor material are the same in the two hybrid cell examples, it is expected that the energy of the FIG. 2B cell will be higher than the energy of the FIG. 2A cell.

Figure 2C:
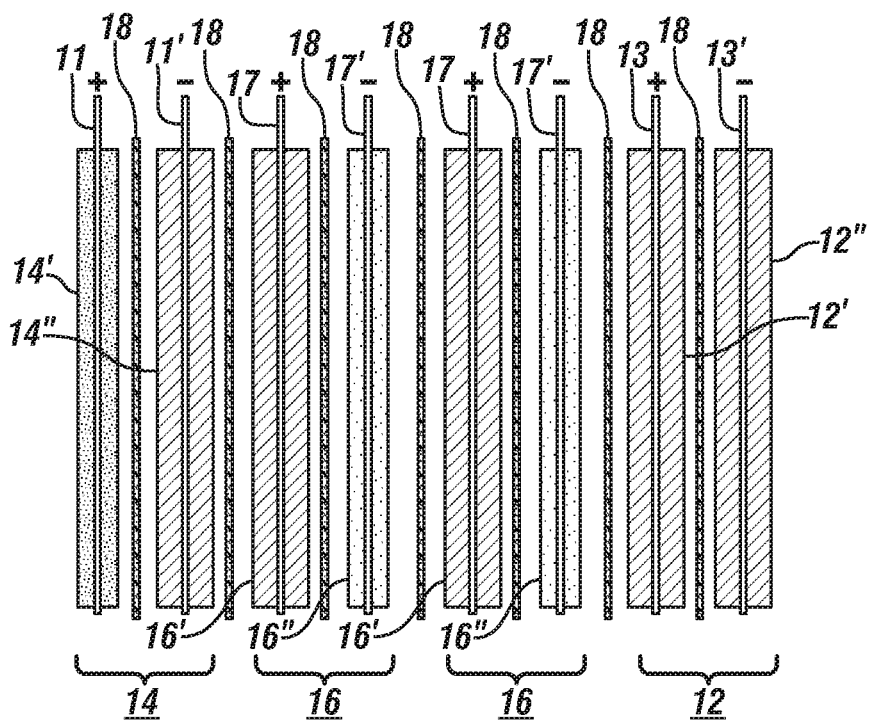

In FIG. 2C, the hybrid electrochemical cell comprises four unit cells—14, 16, 16, 12. As illustrated in FIG. 2C, this combination of unit cells produces a hybrid electrochemical cell formed of a single positively-charged cathode with three positively-charged capacitor electrodes in combination with two negatively charged anodes and two negatively charged capacitor electrodes. Thus, this hybrid cell (14, 16, 16, 12) is provided with five capacitor electrodes and an unbalanced number (3) of lithium-ion battery electrodes. Such a combination of properly composed and sized electrodes can provide substantial power density properties in the resulting hybrid cell or combination of like hybrid cells.

Figure 3A:
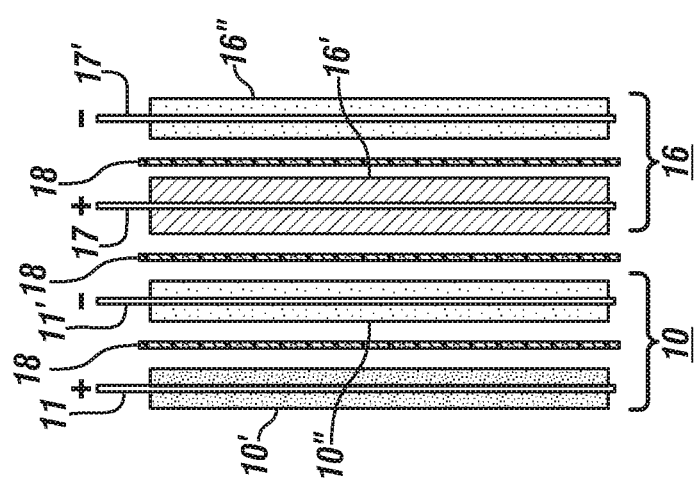

FIG. 3A repeats the side views (from FIG. 2A) of the illustration of the two hybrid cells (10, 16). FIG. 3B then illustrates two such hybrid cells, stacked end to end with an interposed separator 18 in addition to the three porous polymer separators 18 in each hybrid cell (10, 16) (FIG. 3A). In FIG. 3B the electrode and separator members are illustrate as spaced-apart, but in a stacked assembly the members would be packed face-to-face. In this illustration the four positive (+) current collector tabs extending from the top edges of the respective current collectors would be interconnected in an electrically parallel connection in a common positive terminal. And the four negative (−) current collector tabs would be interconnected with a common negative terminal. The stacked assembly of the two interconnected hybrid cells (10, 16) would be placed in a suitable container, such as a pouch which is formed of a thin aluminum sheet coated on both inside and outside surfaces with a thin polymer films. The assembly would be carefully infiltrated with a non-aqueous lithium-cation containing electrolyte such that the pores of the respective layers of electrode material and the separators are filled with the electrolyte solution. The top of the pouch would then be closed to seal the contents of the hybrid electrochemical cell. The positive and negative terminals would be extending from the top of the pouch (or other selected side of the pouch).

FIG. 4A illustrates short cut-off portions of the electrode and separator members of hybrid cell 10, 16 in which the respective cell members are prepared in the form of long rectangular strips with a height and length, and thicknesses of the two-side applied electrode layers, being suitable for the provision of the desired lithium-ion battery/capacitor energy and power properties for the rolled electrochemical cell (110, 116, FIG. 4B)

In FIG. 4A a side view of each short section of the respective electrode layers and separator layers of the rolled hybrid cell assembly are illustrated. FIG. 4B is a schematic side view of the portions of the electrode and separator layers being unwound, each from a starting roll of their respective compositions, and being placed and assembled in the seven-layer rolled assembly of the hybrid cell 210, 216.

FIG. 4B presents a schematic side view of the rolled hybrid cell 210, 216, and FIG. 4C presents an oblique view of the rolled hybrid cell 210,216.

In FIG. 4A, starting from the top illustration of cell member layers, the upper and lower opposing surfaces of current collector 111 are each coated with resin-bonded porous layers of particles of lithium-ion battery cathode material 110'. As stated, the coating on one of the electrodes (such as the top layer coating 110' on strip 111) may be staggered, e.g., beginning at the top of one side and ending at the top of the other side, to avoid waste of overlapping active electrode material in the winding process. The unwinding roll of this cathode material electrode 210' is illustrated in FIG. 4B.

Proceeding downwardly, the next cell member is separator 118. There are also two more interposed separator layers 118 that are unrolled between electrode layers.

Next, the upper and lower opposing surfaces of current collector 111' are each coated with resin-bonded porous layers of particles of lithium-ion battery anode material 110". The unwinding roll of this anode material electrode 210" is illustrated in FIG. 4B.

The upper and lower surfaces of current collector 117 are coated with resin bonded particles capacitor material 116'. And both major surfaces of current collector 117' are coated with resin-bonded porous layers of anode material 116" in unwinding roll 216".

Thus, roll materials 210', 118, 210", 118, 216', 118, and 216" are assembled in layers to provide the roll structure of hybrid cell 210, 216 as illustrated in FIGS. 4B and 4C. In FIG. 4C, positive terminal 210''' connects positively charged current collectors 111 and 117, and negative terminal 216''' connects negatively charged current collectors 111' and 117'. One or more of such rolled electrochemical cells can be placed in a polymer pouch, infiltrated with a non-aqueous lithium ion conducting electrolyte, and sealed around the cell, preferably with the terminals 210''', 216''' extending outside the container for the cell package.

FIGS. 5A through 5C illustrate different embodiments of hybrid electrochemical cells combining lithium-ion battery electrodes and capacitor electrodes. In these embodiments two-sided hybrid electrodes are used in combination with two-sided electrodes of the same electrode material (as described in the above examples) to form a new type of hybrid electrochemical cell.

In FIG. 5A, positive electrode 520 comprises a porous resin-bonded layer of capacitor particles 512 bonded to one side of a metal foil current collector 513 and a porous resin-bonded layer of particles of active cathode material 514 bonded to the other side of the current collector 513. In this example, the negative electrode 522 comprises a metal foil current collector 511 coated on both major sides with porous layers of resin-bonded anode material particles 510. Thus, this hybrid cell is formed with two layers of negatively charged anode material particles 510, and the positive electrode is formed on one porous layer of capacitor particles 512 and one layer of cathode particles 514. A porous separator 518 is placed between the positive electrode 520 and the negative electrode 522. Thus, in this type of hybrid cell construction predetermined energy and power characteristic may be modified using a reduced number of current collectors.

In FIG. 5B the electrochemical cell is formed of two identical positive electrodes 524, each electrode comprising a metal foil current collector 514' coated on both sides with a porous layer of resin-bonded particles of cathode material 514. One of the negative electrodes 526 of the cell is formed of a metal foil current collector 515 coated on one side with a porous resin-bonded layer of anode particles 510 and with a porous layer of capacitor particles 516 on the other side. The other negative electrode 522 is formed with a porous layer of resin-bonded anode particles 510 on each side of the current collector 511. Porous separators 518 are placed between the alternating positive and negative electrodes. Assuming that the compositions of the respective anode, cathode, and capacitor materials are the same, the energy density of the cell of FIG. 5B will be higher than the energy density of the cell illustrated in FIG. 5A by the hybridization of the cell to include a lithium ion capacitor (LIC) and a lithium ion battery (LIB).

FIG. 5C illustrates a hybrid electrochemical cell with a group of six two-sided electrodes, three positively charged and three negatively charged. Two of the positively charged electrodes 520 are formed of positive metal foil current collector foil 513 coated on one side with a porous layer of capacitor particles 512 and coated on the opposite side with a porous resin-bonded layer of particles of a cathode material 514. The third positively charged electrode 528 is formed of a metal foil current collector 517 with porous layers of capacitor particles 512 on both sides of the current collector. One of the negative electrodes 522 is formed with porous layers of particles of anode material 510 resin-bonded to both sides of a metal foil current collector 511. A second negative electrode 526 has a porous layer of anode material 510 bonded to one side of the current collector 515 and a layer of capacitor particles 516 bonded to the other side of the current collector 515. The third negative electrode 530 is coated with a porous layer of capacitor particles 516 on both sides of a negative current collector 517. Thus, the positive electrodes of this hybrid electrochemical cell comprise four layers of capacitor material, and two layers of cathode material. And the negative electrodes of this hybrid electrochemical cell include three layers of anode material and three layers of capacitor material. This hybrid cell combination as illustrated in FIG. 5C includes both a lithium ion capacitor and a capacitor. Using the same electrode materials as in the cells illustrated in FIGS. 5A and 5B, this cell combination (5C) is capable of providing a much higher power density.

In FIG. 6A a side view of the hybrid cell of FIG. 5A is repeated to complement the illustration in FIG. 6B of two such cell units in a stacked electrochemical cell. Each cell unit comprises positive electrode 520 with a capacitor layer 512 and a cathode layer 514, and a negative electrode 522 with two layers of anode material 510. The stacked electrochemical cell arrangement comprises two such unit cells with an interposed separator 18. The positions of the two upstanding tabs of each of the positive (+) and negative (−) current collectors are seen in the oblique view of FIG. 6B. The positive and negative tabs will be connected into positive and negative terminals for the hybrid electrochemical cell. The stacked cell units would be placed in a complimentary sized container, infiltrated with a suitable liquid electrolyte and the cell would be sealed within the container with the positive and negative electrode extending from the container.

FIGS. 7A, 7B, and 7C illustrate the preparation of the same electrode materials of FIG. 6A for a rolled electrochemical cell 720, 722. In FIG. 7A, a short cut-off portion of roll-able sheet 722 of the negative electrode material 710 is illustrated. Negative electrode sheet 722 comprises a metal current collector foil 711 coated on both sides with a porous layer of resin-bonded particles of lithium-ion cell anode material 710. A separator sheet 718 is illustrated below the negative electrode sheet 722. Positioned next to the separator sheet 718 is roll-able positive electrode sheet 720 which comprises a metal current collector 713 coated on the top-side (as illustrated in FIG. 7A) with a porous layer of lithium-ion cell cathode material 714 and on the bottom side with a porous layer of capacitor particles 712. The coating on one of the electrodes (such as the top layer coating 714 on strip 720) may be staggered, e.g., beginning at the top of one side and ending at the top of the other side, to avoid waste of overlapping active electrode material in the winding process.

In FIG. 7B the respective sheets 722, 718, and 720 are illustrated being un-wound from their respective rolls and carefully placed in a wound hybrid electrochemical cell structure 720, 722. FIG. 7C provides an oblique view of the rolled electrochemical cell 720, 722 with its upstanding positive and negative connector tabs 720' (+) and 722' (−).

The above specific examples are intended to illustrate practices of the invention, but these illustrations are not limitations on the scope of the invention. It is clear that the above described basic hybrid electrodes and hybrid combinations of electrodes may be readily prepared and combined to make widely different useful hybrid electrochemical cells with different combinations and balances of battery and capacitor properties.

In general, one or more pairs of electrodes, formed of current collector foils, coated on both sides with a porous layer of battery or capacitor electrode material are used in combination to form lithium-ion based electrochemical cells that incorporate a pre-determined combination of battery and capacitor properties. This combination of properties is obtained by preparing pairs of electrodes having an unequal number of electrode layers of particles of lithium-ion anode and cathode particles combined with a balancing number of porous capacitor material layers to provide the desired battery/capacitor properties in the hybrid electrochemical cell. While some suitable materials have been identified as suitable lithium-ion anode materials, lithium-ion cathode materials, and compatible capacitor materials, other suitable active electrode materials may be used in a specific hybrid combination. Alternating, positive and negative electrodes physically spaced apart by porous separator layers may be assembled in stacks of complementary electrode-separator shapes or in wound rolls of the electrodes and separators. The current collectors of the respective electrodes may be connected in series or parallel arrangement to provide the intended energy and power requirements of the hybrid cell. In an assembled and packaged cell, the pores of each electrode layer are carefully infiltrated with a common non-aqueous solution of a lithium electrolyte salt or compound. And the resulting electrochemical cell may be used in the powering of many types of devices, including automotive vehicles that are partly or wholly powered by electric motors.

The invention claimed is:

1. A hybrid electrochemical cell of lithium-ion battery and capacitor electrodes, the electrochemical cell comprising an assembly of at least one pair of stacked or wound rolls of facing, opposing electrical charge electrodes, each electrode consisting of a two-sided current collector foil coated on both sides with a porous layer of particles of an electrode material, each layer of electrode material being one selected from the group consisting of (i) a lithium ion intercalating/de-intercalating anode material, (ii) a lithium ion intercalating/de-intercalating cathode material, and (iii) a lithium cation adsorbing/desorbing capacitor material or a corresponding anion adsorbing/desorbing capacitor material, the porous layers of each electrode material being separated from each other by the two-sided current collector foil and from a facing layer of an electrode material by a co-extensive porous separator layer, the pores of the facing electrode materials and separator layers being infiltrated with a non-aqueous electrolyte solution containing lithium cations and corresponding anions;

the two porous layers of electrode material that are coated separately on each two-sided current collector foil being selected from the group consisting of: (i) a layer of lithium-ion battery anode material on both sides of the current collector foil, (ii) a layer of lithium-ion battery cathode material on both sides of the current collector foil, (iii) a layer of lithium cation adsorbing/desorbing capacitor material or a corresponding anion adsorbing/desorbing capacitor material on both sides of the current collector foil, (iv) a layer of lithium-ion battery anode material on one side of the current collector foil and a layer of lithium-cation adsorbing/desorbing capacitor material on the opposing side of the current collector foil, and (v) a layer of lithium-ion battery cathode material on one side of the current collector foil and a layer of corresponding anion adsorbing/desorbing capacitor material on the opposing side of the current collector foil; and the at least one pair of opposing electrical charge electrodes including at least one electrode coating layer of capacitor material and an un-equal number of electrode coating layers of anode material and of cathode material, the coating layers on the at least one pair of opposing electrodes being selected to obtain a predetermined combination of energy density (Wh/kg) and power density (W/kg) for the electrochemical cell.

2. An electrochemical cell as stated in claim 1 in which the electrochemical cell comprises one to four pairs of facing, opposing electrodes.

3. An electrochemical cell as stated in claim 1 in which the electrochemical cell comprises at least one grouping of a first pair of opposing electrodes having an electrode with two layers of lithium-ion anode material and an opposing electrode with two layers of lithium-ion cathode material, and a second pair of opposing electrodes having an electrode with two layers of lithium-ion anode material and an opposing electrode with two layers of anion adsorbing/desorbing capacitor material.

4. An electrochemical cell as stated in claim 3 in which the at least one grouping of the two pairs of opposing electrodes with interposed separators are assembled in a stacking of the electrodes and separators or they are assembled as a wound roll of the electrodes and separators.

5. An electrochemical cell as stated in claim 1 in which the electrochemical cell comprises at least one grouping of a first pair of opposing electrodes having an electrode with two layers of lithium-ion anode material and an opposing electrode with two layers of lithium-ion cathode material, and a second and third pair of opposing electrodes, each of the second and third pair having an electrode with two layers of lithium-ion cathode material and an opposing electrode with two layers of lithium cation adsorbing/desorbing capacitor material.

6. An electrochemical cell as stated in claim 5 in which the at least one grouping of the three pairs of opposing electrodes with interposed separators are assembled in a stacking of the electrodes and separators or they are assembled as a wound roll of the electrodes and separators.

7. A hybrid electrochemical cell of lithium-ion battery and capacitor electrodes, the electrochemical cell comprising an assembly of at least two pairs of stacked or wound rolls of facing, opposing electrical charge electrodes, each electrode consisting of a two-sided current collector foil coated on both sides with a porous layer of particles of an electrode material, the porous layers of each electrode material being separated from each other by the two-sided current collector foil and from a facing layer of an electrode material by a co-extensive porous separator layer, the pores of the facing electrode materials and separator layers being infiltrated with a non-aqueous electrolyte solution containing lithium cations and corresponding anions;

the two porous layers of electrode material that are coated separately on each two-sided current collector foil being selected from the group consisting of: (i) a layer of lithium-ion battery anode material on both sides of the current collector foil, (ii) a layer of lithium-ion battery cathode material on both sides of the current collector foil, and (iii) a layer of lithium cation adsorbing/desorbing capacitor material or a layer of corresponding anion adsorbing/desorbing capacitor material on both sides of the current collector foil; and the at least two pairs of opposing electrical charge electrodes including at least one two-side coated capacitor electrode and an un-equal number of electrodes of anode material and of cathode material, the coating layers on the at least two pairs of opposing electrodes being selected to obtain a predetermined combination of energy density (Wh/kg) and power density (W/kg) for the electrochemical cell.

8. An electrochemical cell as stated in claim 7 in which the electrochemical cell comprises at least one grouping of a first pair of opposing electrodes having an electrode with two layers of lithium-ion anode material and an opposing electrode with two layers of lithium-ion cathode material, and a second pair of opposing electrodes having an electrode with two layers of lithium-ion anode material and an opposing electrode with two layers of anion adsorbing/desorbing capacitor material.

9. An electrochemical cell as stated in claim 7 in which the electrochemical cell comprises at least one grouping of a first pair of opposing electrodes having an electrode with two layers of lithium-ion anode material and an opposing electrode with two layers of lithium-ion cathode material, and a second and third pair of opposing electrodes, each having an electrode with two layers of lithium-ion cathode material and an opposing electrode with two layers of lithium cation adsorbing/desorbing capacitor material.

* * * * *